Figure 1:
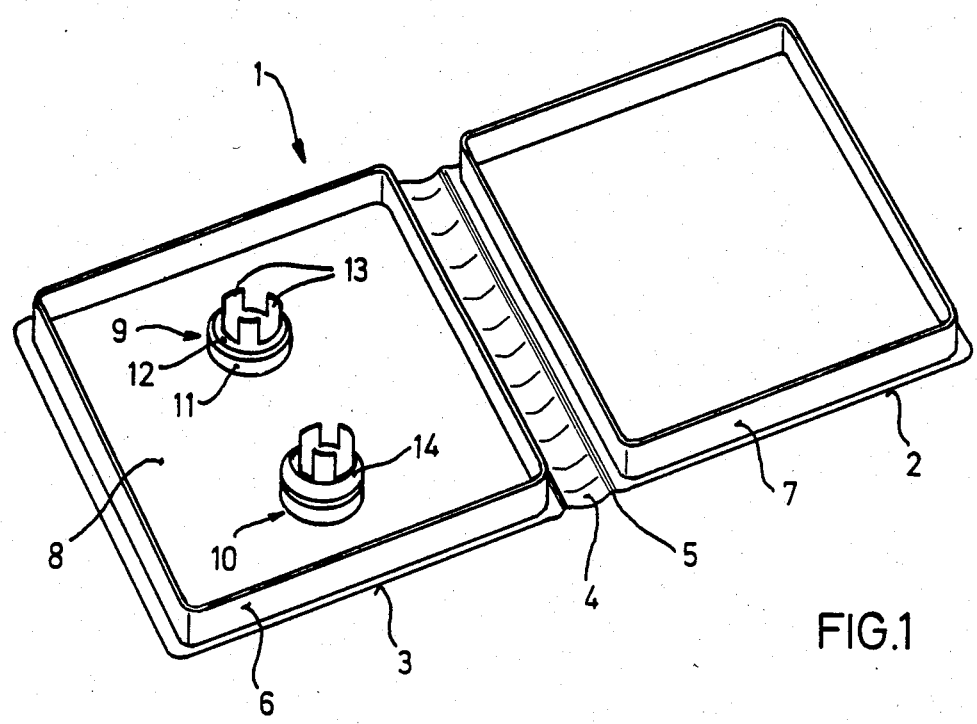

United States Patent [19]
Dietze et al.

[11] Patent Number: 4,614,269
[45] Date of Patent: Sep. 30, 1986

[54] PACKAGING CONTAINER FOR A TAPE REEL DEVICE E.G. A TAPE CASSETTE

[75] Inventors: Herbert Dietze, Berghaupten; Dietmar Huebner, Oberkirch; Friedhelm Wagner, Birkenau; Manfred Duebon, Willstaett; Gerd Wenz, Ludwigshafen, all of Fed. Rep. of Germany

[73] Assignee: BASF Aktiengesellschaft, Ludwigshafen, Fed. Rep. of Germany

[21] Appl. No.: 726,985

[22] Filed: Apr. 25, 1985

[30] Foreign Application Priority Data

Apr. 27, 1984 [DE] . Fed. Rep. of Germany ... 8412949[U]

[51] Int. Cl.⁴ ............................................. B65D 85/07
[52] U.S. Cl. ..................................... 206/387; 206/493
[58] Field of Search ................ 206/387, 493; 220/339; 242/199

[56] References Cited

U.S. PATENT DOCUMENTS 3,783,200  1/1974  Jantzen et al. ................. 206/387 X
4,049,119  9/1977  Wilson ............................... 206/387
4,211,337  7/1980  Weavers et al. ................ 206/387 X
4,428,481  1/1984  Basili ................................. 206/387

FOREIGN PATENT DOCUMENTS 2356015  5/1975  Fed. Rep. of Germany ...... 206/387

Primary Examiner—Steven M. Pollard
Attorney, Agent, or Firm—Keil & Weinkauf

[57] ABSTRACT

A packaging container (1) for a tape reel device, e.g. a tape cassette, which has one or more reel-locking elements (9, 10) possesses on at least one of these elements (9, 10) a friction element (14), e.g. of rubber, for holding and, if necessary, clamping the reel of the tape reel device. The element (14) can be annular, rib-shaped or knob-shaped, and can be used for any type of tape reel, inside or outside audio, video or film cassettes.

5 Claims, 5 Drawing Figures

PACKAGING CONTAINER FOR A TAPE REEL DEVICE E.G. A TAPE CASSETTE

The present invention relates to a packaging container for a tape reel device, e.g. a magnetic tape cassette, the packaging container being of the kind having one or more reel-locking elements which project into one or more reel drive openings when the tape reel device is inserted into the packaging container.

Packaging containers of the kind referred to are known for all types of tape cassettes, in particular for magnetic tape cassettes, such as compact cassettes, video cassettes and data cassettes, and film cassettes. The purpose of the reel-locking element in these known packaging containers is to prevent unintentional unrolling of the sensitive recording tape, which may produce loops in the tape and, in the absence of further measures, result in damage to the tape, for example resulting in image errors being produced in video cassettes. The conventional reel-locking elements are either rigid elements with outer toothing or axially spring-loaded pins which engage appropriately shaped drive openings. The last-mentioned spring-loaded pins are expensive, and therefore uneconomical to manufacture.

It is an object of the present invention to provide a packaging container of the kind referred to which possesses an effectively operating reel-locking element which is simple to manufacture.

According to one aspect of the invention there is provided a packaging container of the kind referred to wherein the or at least one of the reel-locking elements has, on its outer surface which is intended to come into contact with a tape reel of the tape reel device, one or more friction elements made of a material which has a high coefficient of friction with respect to the tape reel material.

Surprisingly, the provision of such a friction element or friction elements makes it unnecessary to match the shape of the locking element to that of the drive opening of the tape reel, but still permits effective locking.

Conveniently the or each friction element comprises a component, made of rubber or a rubber-like material, which advantageously can be mounted subsequently, e.g. on the periphery of the locking element.

A reel-locking element having a substantially circular contour in plan can advantageously be provided with a frictional element in the form of an annular element of a rubber material, preferably an O-ring, on its periphery. This permits easy assembly during manufacture of the packaging container and also provides a simple possibility for subsequently adapting packaging containers not originally provided with such annular elements to produce more efficient locking of the reel.

Suitably an annular rubber element for use in a packaging container according to the invention has an internal diameter substantially the same as the external diameter of the locking element, and the external diameter of the annular rubber element substantially corresponds to the diameter of an annular shape in the tape reel and is, in particular, larger than the internal diameter of the drive opening.

Consequently, a component for improving the locking effect is made available, and this component can advantageously also be sold as an accessory for cassette containers. The majority of manufacturers of professional video cassettes recommend, for example, that the tape be tensioned by rotating the reel from outside before putting a cassette into operation. When the rubber ring according to the invention is used, such a safety measure is superfluous since loosening of the tape is prevented. According to another aspect of the invention there is provided a method of improving the performance of a packaging container for a tape reel device, e.g. a magnetic tape cassette, having at least one tape reel, the packaging container having one or more reel-locking elements intended to project into one or more reel drive openings when the tape reel device is inserted into the packaging container, comprising positioning an annular element made of a rubber or rubber-like material around the periphery of the or one of the reel-locking elements, the annular element being designed to come into contact with the or one of the said at least one tape reels when the tape reel device is inserted into the packaging container.

Figure 2:
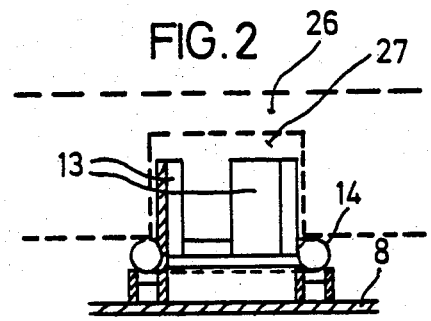
Figure 3:
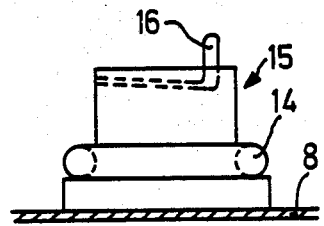
Figure 4:
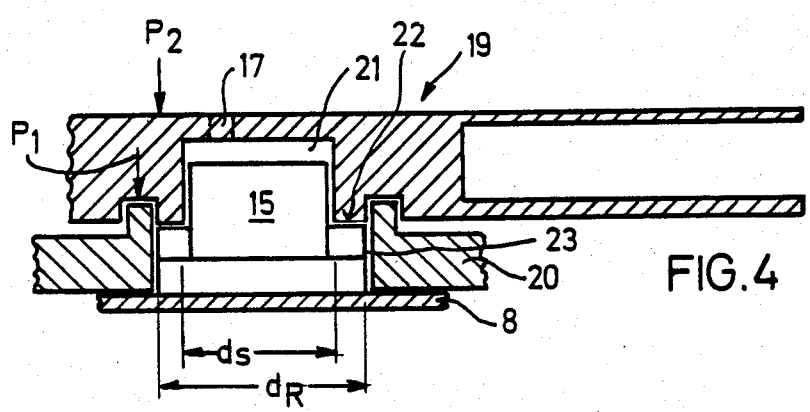
Figure 5:
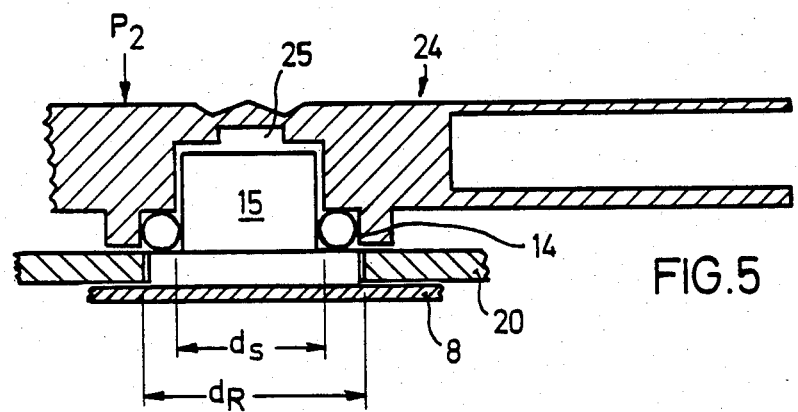

An embodiment of the invention will now be described, by way of example, with reference to the accompanying drawing, in which FIG. 1 shows a commercial book-type packaging container according to the invention for a video cassette and having locking elements, FIGS. 2 and 3 show embodiments of locking elements of packaging containers according to the invention and FIGS. 4 and 5 show locking elements engaged with reels of video tape cassettes.

FIG. 1 shows a book-type packaging container 1 comprising book-cover parts 2 and 3 which are connected to one another by means of a spine part 4 via film hinges 5. Each of the parts 2 and 3 is provided with an open, substantially rectangular compartment 6 and 7 which can be of a size such that one compartment fits into the other and forms a dust-tight container 1. However, it is also possible for the compartments 6 and 7 to be identical in form. Inside, on the base wall 8 of compartment 6, two reel-locking elements 9 and 10 are shown. Each element 9, 10 consists of, for example, a cylindrical outer ring 11 and an inner ring 12 with vertical teeth 13 formed thereon. The diameter of the outer contour of the said inner ring 12 is approximately the same as the internal diameter of the drive opening of the reel of a tape cassette to be placed thereon. While the locking element 9 is a conventional one, the locking element 10 is provided, in accordance with the invention, with an O-ring 14 whose internal diameter at least substantially corresponds to the external diameter of the inner ring 12. The O-ring 14 should be such that it can just be pushed on conveniently and should then be held elastically so that it cannot be lost.

FIG. 2 shows a section through the element 10 with O-ring 14. The underneath of the O-ring 14 lies in an annular groove between inner ring 12 and outer ring 11. In FIG. 2, reference numeral 26 is a diagrammatic illustration of part of a tape reel, the lower face of which rests directly on the O-ring 14. FIG. 3 shows a conventional, roughly cylindrical embodiment 15 of a locking element, a conventional spring-loaded pin 16 being indicated by a broken line on the front wall. The additional use of the O-ring 14 provides protection against rotation of the reel, since a single pin 16 need not necessarily engage one of the drive holes 17 (FIG. 4) of the reel. FIG. 4 shows a section through a reel 19 of a video cassette, the housing of which is designated by 20. The locking element 15, which is cylindrical in this case too, engages the cylindrical opening 21 of the reel 19, and the lower edge 22 of the reel rests on the rubber component, which in this case is a ring 23 having an at least approximately square cross-section.

FIG. 5 shows another cassette reel 24 with a drive opening 25 and the locking element 15 which is likewise cylindrical but in this case has an O-ring 14.

The weight of the reels 19, 24 and 26 is supported on the friction component or rubber component 14 or 22, and rotation of the reel is effectively prevented by means of the frictional force between the friction material or rubber material and the plastic material of the reel. The only forces operative in this case are the forces $P_1$. When the cassette is clamped inside the container 1, and the rubber ring 14, 22 is of appropriate dimensions, there is an additional axial compressive force $P_2$ which also prevents axial movement of the reel and exerts an additional force which opposes lateral or rotary movement of the reel.

In the types of reels described, the dimensions of the rubber component should preferably be chosen so that the reel or the hub rests on the rubber component, as a friction component, on one or both sides. The external diameter $d_R$ of the ring 14, 22 should therefore be chosen larger than the internal diameter of the drive opening $d_S$.

Another possible embodiment of the container is one which has locking elements 9, 10 or 15 which are located on both sides of the packaging container and engage the same reel or reels, and some or all of which are provided with rubber components, the said embodiment being advantageous for some applications. In the case of reels or hubs having spokes inside the drive opening, the rubber components can also be brought to rest on the spokes. If circular grooves of suitable dimensions are provided in the cyclindrical body of the element 15, rubber components can be present; in this case, the rubber components come into contact with the inside of the reel openings 21, 25 and 26.

In principle, the friction component or rubber component can have any form and arrangement which is suitable for the frictional and, if required, clamping function. For example, axial ribs are just as suitable as annular components, annular parts or rib parts, e.g. friction knobs, etc.

We claim:

1. A container for packaging a recording tape cassette, comprising at least one tape reel with a central opening, while not in use, said container including at least one reel-locking element with an outer ring portion at its base having a first diameter and an inner ring portion at its top having a second diameter smaller than said first diameter, said diameter being substantially the same as the diameter of said central opening of said tape reel,
    wherein around the second, smaller diameter, there is provided an annular elastic friction element having an internal diameter substantially corresponding to the second, smaller diameter of said top ring portion and having an external diameter larger than the central opening of the tape reel, said annular friction element being of a material having a high coefficient of friction with respect to plastic material,
    whereby in the open position of the container, the tape reel is supported on the friction element which prevents rotation of the tape reel by means of the frictional force between the frictional material and the plastic material of the reel, and in the closed position of the container, the tape reel is clamped onto said elastic friction element and thereby exerts an additional axial force for preventing axial movement and lateral or rotary movement of the contained tape reel.

2. A container for packaging a magnetic tape cassette, comprising two coplanar tape reels each with a central opening, while not in use, said container including two reel-locking elements each with an outer ring portion at its base having a first diameter and an inner ring portion at its top having a second diameter smaller than said first diameter, said first diameter being substantially the same as the diameter of said central opening of the associated tape reel,
    wherein around the second, smaller diameter of said reel-locking element there is provided an annular friction element having an internal diameter substantially corresponding to the second, smaller diameter of said top ring portion and having an external diameter larger than the central diameter of each of the tape reels, said annular friction element being of a material having a high coefficient of friction with respect to plastic material,
    whereby in the open position of the container the two tape reels are supported on the friction elements which prevent rotation of the tape reels by means of the frictional force between the frictional material and the plastic material of the reel and in the locked position of the container the tape reels are clamped onto said elastic friction elements and thereby exert an additional axial compressive force for preventing axial movement and lateral or rotary movement of the contained two reels.

3. A container as claimed in claim 2, wherein the annular friction elements comprise a component made of rubber.

4. A container as claimed in claim 2, wherein the annular friction elements comprise a component made of rubber-like material.

5. A container as claimed in claim 2, wherein the annular friction elements consist of two O-rings.

* * * * *